Feb. 24, 1953   I. S. EGGLESTON ET AL   2,629,486
STOPPAGE CAUSE LOCATOR FOR CONVEYERS
Filed Oct. 28, 1950   3 Sheets-Sheet 1
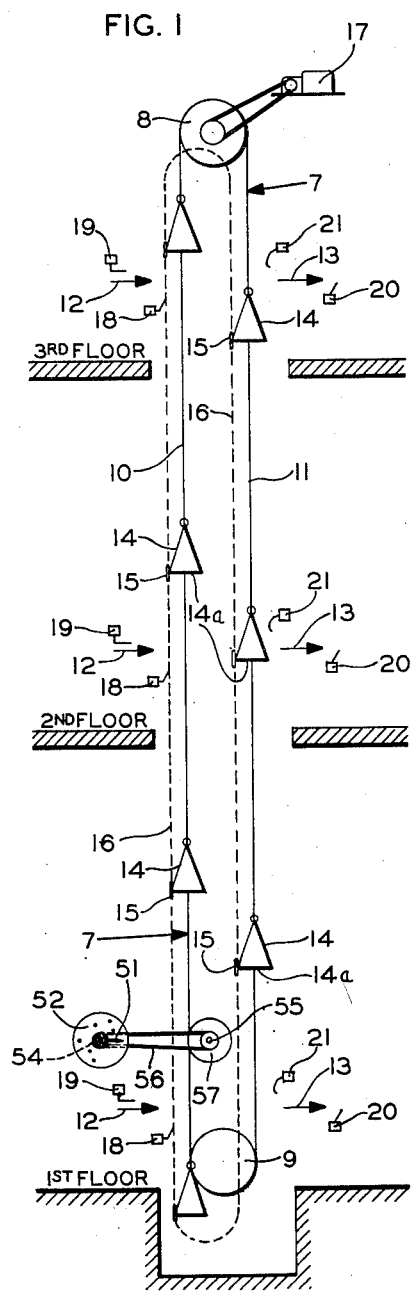
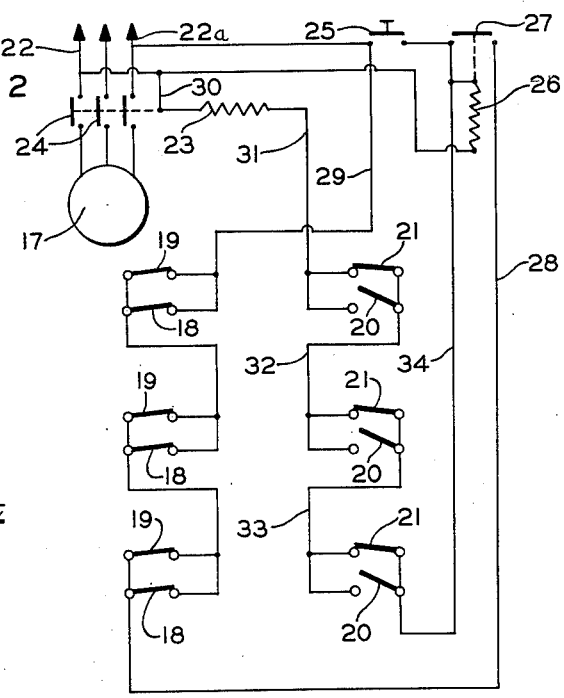
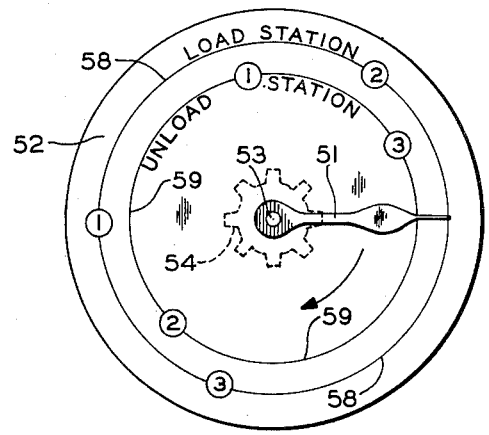
INVENTORS.
IRA S. EGGLESTON
CHARLES R. BOLLER
BY John E. Stryker
ATTORNEY

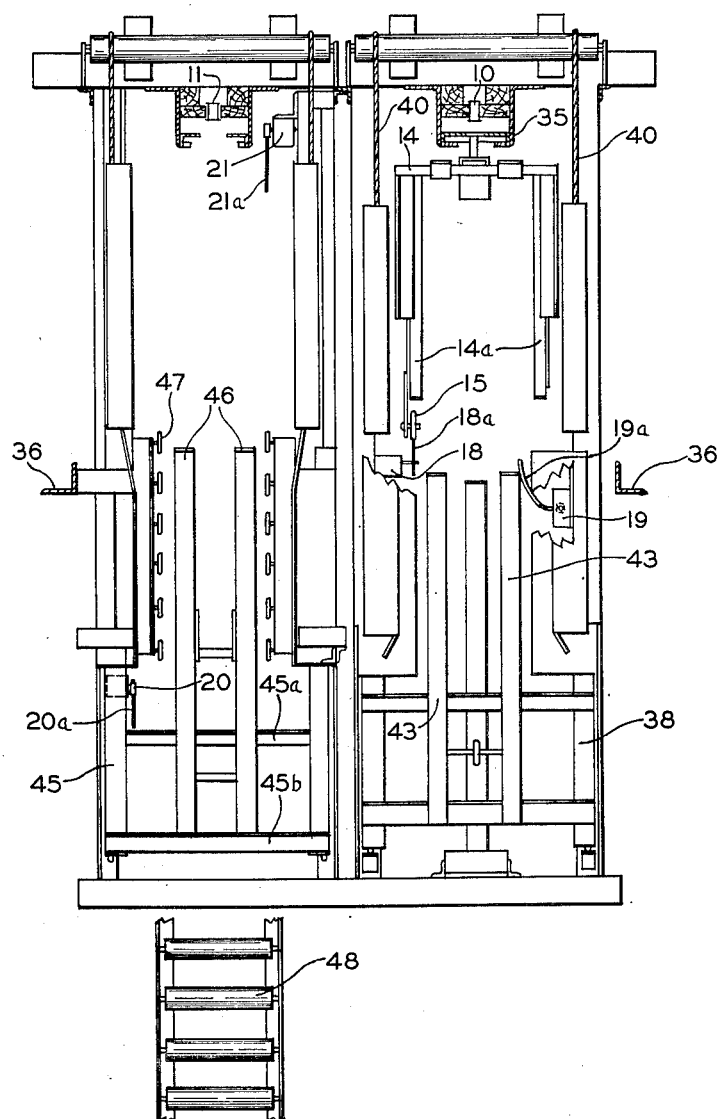

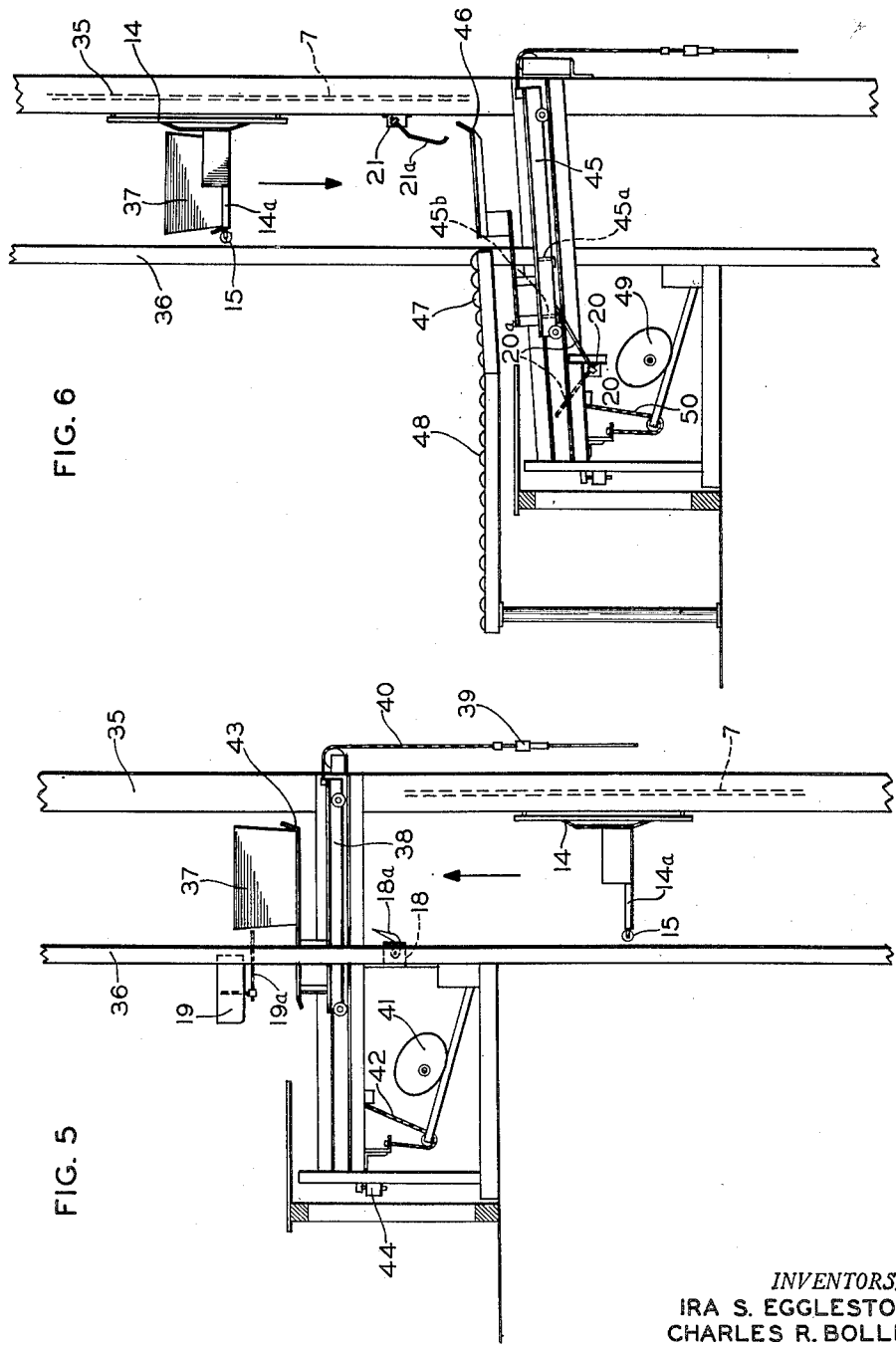

Patented Feb. 24, 1953

2,629,486

UNITED STATES PATENT OFFICE 2,629,486

STOPPAGE CAUSE LOCATOR FOR CONVEYERS

Ira S. Eggleston, St. Paul, and Charles R. Boller, North St. Paul, Minn., assignors to Standard Conveyor Company, North St. Paul, Minn., a corporation of Minnesota Application October 28, 1950, Serial No. 192,674

8 Claims. (Cl. 198—232)

1

This invention relates to conveyors provided with automatically operating means for stopping the conveying mechanism in response to certain abnormal conditions and particularly to mechanism adapted to indicate or identify the location of any such abnormal condition when the conveyor stops as a result thereof.

It is an object of our invention to provide for conveyors of the class described simple and reliable mechanism which is operative at any selected station to indicate the location of any abnormal condition which results in the interruption or stoppage of the conveyor.

A particular object is to provide for a conveyor of the class described electric controls including limit switches adapted to stop the conveyor at various stations along the path thereof in response to abnormal conditions locally, in combination with mechanism including a hand operatively connected to the conveyor to move in unison therewith and a dial associated with said hand and having legends which, by reference to the position of the hand when the conveyor stops, identify the locations of the particular abnormal condition and switch which have caused the stoppage.

Other objects will appear and be more fully pointed out in the following specification and claims.

The present invention is particularly adapted for use with conveyors of the endless type having uniformly spaced load carriers movable along a determined path and loading and/or unloading mechanism for the carriers spaced along the path thereof to deliver load units to or receive such units from the conveyor carriers. Such conveyors may be provided with electric controls including limit switches located at or associated with the several unloading and/or unloading mechanisms whereby the conveyor is stopped when any load unit is improperly positioned in relation to the loading or unloading mechanisms or conveyor carriers. An example of this type of conveyor is that described in our application Serial No. 180,598, now Patent No. 2,601,915, filed August 21, 1950. Where there are a large number of loading and/or unloading stations spaced along such a conveyor, it is particularly time consuming and difficult to locate the cause of any stoppage resulting from the operation of a remote limit switch in the absence of a stoppage cause locator, positioned within view of an operator or service man in charge of the conveyor mechanism. The present invention fulfills the need for such a stoppage cause locator of simple and reliable construction.

2

Referring to the accompanying drawings which illustrate by way of example and not for the purpose of limitation, a simple embodiment of our invention:

Fig. 1 is a diagrammatic elevational view showing the invention in connection with a conveyor having an endless chain and regularly spaced load carriers adapted to travel along a path adjacent to loading and unloading stations at various elevations;

Fig. 2 is a wiring diagram showing a suitable arrangement of limit switches for stopping the conveyor in response to certain abnormal conditions at the several loading and unloading stations;

Fig. 3 is a front elevational view showing our indicator dial and hand with indicia suitably arranged for the installation shown in Fig. 1;

Fig. 4 is a part plan view and part horizontal sectional view showing the conveyor and loading and unloading mechanism at one of the floors or stations;

Fig. 5 is a somewhat diagrammatic side elevational view showing a portion of the conveyor, suitable loading mechanism and a pair of limit switches associated therewith, and Fig. 6 is a similar diagrammatic view showing a portion of the conveyor and one of the unloading mechanisms with associated limit switches.

Referring to Fig. 1 of the drawings, the conveyor, shown diagrammatically, is of the type adapted to operate between floors of a building and having an endless chain indicated generally by the numeral 7 trained on a power driven sprocket wheel 8 located above the top floor and an idler sprocket wheel 9 located near or below the bottom floor. The chain 7 has an ascending reach 10 and a descending reach 11 extending adjacent to automatic loading and unloading mechanisms located at the several floors of a building. Horizontal arrows 12 and 13 indicate the approximate elevations of the loading and unloading mechanisms for the several floors and suspended from the chain 7 at suitable regularly spaced intervals are load carriers indicated generally by the numeral 14. These carriers are suspended from pins joining their upper ends to the chain links and load carrying arms 14a are provided on each carrier. Projecting from the front end of one of the load carrying arms 14a of each carrier is a wheel 15 adapted to actuate certain of the limit switches hereinafter described. The load carriers are retained in proper upright positions throughout their cycle of operation by suitable guides so that the several wheels 15 are caused to travel along a path indicated by the broken lines 16 in Fig. 1. The chain 7 is normally driven continuously through suitable connections with an electric motor 17.

Among the electric controls for the conveyor motor 17 are a pair of switches 18 and 19 for the loading mechanism for each floor and a pair of switches 20 and 21 associated with the unloading mechanism for each floor, these switches being operative to stop the motor 17 in response to certain abnormal conditions locally, as hereinafter more fully described. As shown in Fig. 2, the switches 18—21 are included in control circuits for the motor 17 which may be supplied with electric current from a suitable source through line conductors 22 and 22a and an automatic starter relay having a coil 23 and armature actuated contacts 24. The starter circuit includes a push button switch 25 adapted to close a branch circuit including a coil 26 of a holding relay. Upon the energization of the coil 26, a spring contact 27 of this relay closes to complete a circuit including a conductor 28 extending to terminals of a pair of the switches 18—19, these switches being in parallel, one with the other, and in series with the other pairs of switches 18—19. This circuit also includes a conductor 29 which is supplied with current from the line conductor 22a. The other side of the circuit under control of the holding relay extends from the line conductor 22 and includes conductors 30, 31, 32, 33 and 34, coil 23 of the starter relay and the contact 27 of the holding relay. The switches 18, 19 and 21 are spring biased to normally closed position and the switches 20 are similarly biased to normally open position in order to detect the particular abnormal conditions hereinafter described in detail, by way of example.

Loading and unloading mechanisms like those more fully described in our application Serial No. 180,598, now Patent No. 2,601,915 filed August 21, 1950, are illustrated in Figs. 4, 5 and 6. As shown, vertically extending guiding members for the chain reaches 10 and 11 and conveyor carriers 14 are indicated at 35 and other vertical frame members at 36. The ascending reach 10 and descending reach 11 of the chain 7 are guided between pairs of the frame members 35 and the load supporting arms 14a of each carrier 14 project horizontally in substantially parallel, spaced relation one to the other to support and carry load units which may comprise boxes 37 of uniform size containing the material to be transported.

Each of the loading mechanisms comprises a carriage 38 having anti-friction supporting wheels so that each carriage is movable substantially horizontally on suitable fixed rails to and from position to load boxes 37 on the carriers 14. Each carriage 38 is biased toward the extended position indicated in Fig. 5 by a pair of weights 39 operating through cables 40 and movement of each carriage is under control of mechanism which causes it to be extended and retracted in timed relation to the operation of the conveyor chain. The operating mechanism includes a cam 41 which is continuously rotated in timed relation to the conveyor chain and arranged to actuate a cable 42 which is connected to the rear end of the carriage. Load supporting arms 43 are provided on each carriage 38 and the carriage is normally held in retracted position out of the path of the load units on the carriers 14 by means of suitable latch mechanism under control of a solenoid 44.

Since the conveyor moves the load units through restricted passages in the building floors and conveyor frame, interference with normal operation and damage will result unless the load units are properly positioned on, fed to and removed from the load carriers 14 at precisely coordinated times in relation to the movement of these carriers. Our switches 18—21 are arranged to guard against such interference and damage as a result of certain specific abnormal conditions presently to be described. The normally closed switch 18 is supported on the conveyor frame at an elevation slightly below that of the load carrying arms 43 and is provided with a movable arm 18a which projects in the path of the wheels 15 of the ascending carriers 14 so that this switch is opened momentarily as each of these load carriers approaches the loading mechanism.

The switch 19 is normally closed when a box 37 on the loading arms 43 is in either fully retracted or fully extended position in relation to the path of the carriers 14, and is opened by engagement with arms 19a with a side of a box 37 when the latter is in any partially retracted position on the arms 43. Thus if a box 37 on the arms 43 is not either entirely out of the path of the carriers or in fully extended position where it can be picked up by the approaching load carrier, switch 19 will be open and the conveyor will stop when switch 18 is opened by engagement of a wheel 15 of a carrier 14 with the arm 18a of switch 18. When a load unit or box 37 is in fully extended position, indicated in Fig. 5, the switch 19 is closed and the subsequent opening of the switch 18 will not stop the conveyor. The loading mechanism described and limit switches 18 and 19 are duplicated at each loading station, so that the load units are fed to the conveyor at predetermined elevations above the several floors, as indicated by the arrows 12 in Fig. 1.

Our unloading mechanism, best shown in Figs. 4 and 6, is duplicated at the several unloading stations at elevations such as those indicated by the arrows 13 (Fig. 1) and may comprise an extensible and retractile carriage 45 carrying elevated arms 46 for removing the boxes 37 from descending carriers 14. Series of gravity rollers 47 and 48 are arranged to receive the boxes 37 from the arms 46 and these arms are movable from the fully extended position shown in Fig. 6 to the retracted position shown in Fig. 4. The carriage 45, like the carriage 38, is biased toward extended position and its movement to and from the extended position shown in Fig. 6 is under control of cam operated mechanism including a cam 49 operatively connected to the conveyor chain 7 for rotation in timed relation thereto and arranged to actuate a cable 50 which is connected to the carriage 45 to positively retract it in synchronism with the movement of the load carriers 14.

A switch 20 at each unloading station is normally open but is held closed by members of the carriage 45 when the latter is either in the fully extended position (Fig. 6) or in the fully retracted position (Fig. 4). An actuating arm 20a of the switch 20 projects in the path of the cross members 45a and 45b (Fig. 4) of the frame of the carriage 45 so that when the carriage 45 is in fully retracted position its frame member 45a engages the switch arm 20a to hold the switch 20 closed and when the carriage is in fully extended position the frame member 45b holds this switch closed.

The switch 21 is normally closed and is provided with an arm 21a which projects in the path if the load carriers 14 in such position as to cause the opening of the switch 21 as each descending carrier approaches the unloading mechanism of a station. Switch 21 being in parallel with the switch 20 in the motor control circuit will cause the conveyor to stop if the switch 20 is open at the moment switch 21 is opened. Since the unloading mechanism is normally either in its fully extended or fully retracted position, the switches 20 and 21 coact one with the other in stopping the conveyor in response to the abnormal condition existing when the unloading mechanism is only partially extended in the path of a descending load carrier.

It will be evident that the present invention is not limited to use in connection with the particular arrangement of loading and unloading mechanisms briefly described herein and more fully described in our application Serial No. 180,598, nor is it limited to controls adapted to stop the conveyor in response to the particular abnormal conditions hereinbefore described.

As shown in Figs. 1 and 2, our stoppage cause locater comprises a hand 51 which is operatively connected to the conveyor chain 7 to rotate over the face of a dial 52 continuously in one direction and at a rate which is proportional to the rate of travel of the chain. The hand 51 is fixed on a shaft 53 which projects at the front face of the dial 52 and this shaft is driven by connections with the chain 7 which may comprise sprocket wheels 54 and 55, a chain 56 trained on the wheels 54 and 55 and a sprocket wheel 57 which is mounted on a shaft carrying the coaxial sprocket wheel 55 and continuously in mesh with the chain 7 so as to be driven thereby.

The hand 51 is preferably rotated at an angular rate of speed which causes it to turn more than 360 degrees over the face of the dial 52 while the conveyor chain 7 is traveling a distance equal to the spacing along the chain 7 between adjacent load carriers 14, these carriers being equally spaced along the chain. It is advantageous, for example, to rotate the hand 51 two or more complete revolutions during the travel of the conveyor chain a distance equal to the center to center spacing of the several load carriers along the chain. By so doing we greatly expand the scale of the dial 52 and so that the several indicia on the dial, identifying the location of the several abnormal conditions when the conveyor stops, may be readily distinguished one from another even with installations where there are a multiplicity of switches for detecting numerous abnormal conditions and for causing the conveyor to stop when any such condition exists.

As best shown in Fig. 3, the face of the dial 52 carries two concentric series of indicia spaced along circles indicated respectively by the numerals 58 and 59 and identifying by the appropriate numerals 1, 2 and 3 the several stations and limit switches associated with the first, second and third floors of the building. The indicia spaced along circle 58 may be employed to identify the several loading stations and limit switches 18 and 19 associated therewith at floors 1, 2 and 3 and the indicia spaced along circle 59 may identify the several unloading stations and their limit switches 20 and 21. Thus the outer circle 58 may be marked "Load station" and the inner circle 59 "Unload station," as in Fig. 3.

The several indicia on the dial 52 are spaced along the path of the hand 51 angular distances which are proportional to the spacing of the several limit switches along the path of the load carriers 14. For the purpose of calibrating the dial 52 or location of the several indicia thereon, the endless broken line 16 may be regarded as the path of the load carriers 14 and the positions of the several switches 18 and 21 may be regarded as the positions where the several abnormal conditions resulting in the stoppage of the conveyor may occur. It will be evident that calibration of the dial 52 for each installation must be in relation to particular dimensions and the locations of the stop switches along the path of the conveyor for the particular installation.

In further explanation of our invention the following specific example of the calibration and operation of our stoppage cause locator based on an installation of assumed dimensions is given. It may be assumed that the conveyor illustrated in Fig. 1 has a chain 7 of seventy foot length with seven load carriers 14 spaced along the chain at ten foot intervals, and that the hand 51 is geared to the chain 7 so that the hand rotates three complete revolutions or 1080 degrees for each ten feet of travel of the chain 7. For this example it is further assumed that the distances along the path of the load carriers from switch 18 at the first floor to switches 18 at the second and third floors and to the several switches 21 are as follows:

To switch 18, second floor, 14.5 feet
To switch 18, third floor, 26 feet
To switch 21, third floor, 34.75 feet
To switch 21, second floor, 46.25 feet
To switch 21, first floor, 60.75 feet
Complete cycle, 70 feet With such spacing of the switches, the dial 52 may be calibrated as follows:

From point 1 to point 2 on circle 58:

$$1080° \times \frac{14.5}{10} = 1566° \text{ or 4 turns plus } 126°$$

From point 1 to point 3 on circle 58:

$$1080° \times \frac{26}{10} = 2808° \text{ or 7 turns plus } 288°$$

From point 1 on circle 58 to point 3 on circle 59:

$$1080° \times \frac{34.75}{10} = 3753° \text{ or 10 turns plus } 150°$$

From point 1 on circle 58 to point 2 on circle 59:

$$1080° \times \frac{46.25}{10} = 4995° \text{ or 13 turns plus } 315°$$

From point 1 on circle 58 to point 1 on circle 59:

$$1080° \times \frac{60.75}{10} = 6561° \text{ or 18 turns plus } 81°$$

Complete cycle:

$$1080° \times \frac{70.00}{10} = 7560° \text{ or 21 turns exactly}$$

Dial 52 is calibrated accordingly so that no two indicia are radially aligned. If in any installation two or more indicia should be radially aligned the difficulty may be obviated by moving the switches identified by the aligned indicia along the path of the conveyor a few inches and then readjusting the indicia proportional distances along the path of the hand 51.

In operation the conveyor chain 7 is normally in continuous operation to move the load carriers 14 successively along the ascending reach 10 and then down the descending reach 11, past the loading and unloading mechanisms, along the endless path defined by the chain 7 and carrier guides. Normally the load units are delivered automatically to the load carriers 14 by the loading mechanisms at the several floors and the units carried by the carriers 14 are delivered at selected unloading stations by suitable automatic or manual controls or by timing mechanism such as that described in our application Serial No. 180,598, now Patent No. 2,601,915. To prevent damage to the mechanism and load units when an abnormal condition develops or is caused by incorrect manipulation of the load units, the limit switch 18—21 and numerous other devices for detecting the condition and stopping the conveyor are provided at points suitably located along the path of the conveyor and the hand 51 stops in a position which by reference to the indicia on the dial 52 locates the cause of the stoppage. For example, when the conveyor stops due to the opening of the switches 18 and 19 at the third floor loading station, the location of the difficulty is indicated by the stopping of the hand 51 at point No. 3 on circle 58. After the abnormal condition has been corrected, an operator merely closes the starter switch 25 (Fig. 2) to cause the conveyor to resume normal operation. Similarly stoppage caused by operation of either of the other pairs of switches 18, 19 or by any pair of switches 20, 21 is instantaneously located by observation of the position of the hand 51 when it stops with reference to the indicia identifying the several pairs of switches and the stations associated therewith. Our invention thus eliminates all tedious searching for the location of the several abnormal conditions causing the stoppage.

It will be evident that our improved stoppage cause locator may be adapted for use with numerous other types of conveyors merely by suitable calibration of the dial in relation to the paths of the indicator hand and load carriers.

Any required number of circular rows of indicia may be so located on the dial 52 to properly identify any of a large number of abnormal conditions and corresponding series of stop switches and their associated stations.

Having described our invention, what we claim as new and desire to protect by Letters Patent is:

1. In combination with an endless conveyor having a plurality of load carriers which are normally in motion along a determined path, a plurality of stations spaced along said path, electric controls for said conveyor including a series of stop switches spaced along said path and associated with the several stations for interrupting the operation of said conveyor in response to an abnormal condition at the associated station and identification mechanism including stationary indicia and a pointer and operatively connected to said conveyor to move at a rate which is proportional to the rate of movement of said carriers adapted to identify any particular switch which is actuated to interrupt the operation of said conveyor as a result of an abnormal condition at the associated station.

2. In combination with an endless conveyor having a plurality of load carriers which are normally in motion along a determined path, electric controls for said conveyor including a series of stop switches spaced along said path for interrupting the operation of said conveyor in response to an abnormal condition locally, and identification mechanism adapted to identify any particular switch which is actuated to interrupt the operation of said conveyor as a result of an abnormal condition comprising a pointer operatively connected to said conveyor to move along a determined path at a rate which is proportional to the rate of movement of said carriers, and stationary indicia spaced along the path of said pointer proportionally to the spacing of said stop switches along the path of said load carriers.

3. The combination defined in claim 2 in which said identification mechanism comprise a dial, a pointer movable over the face of said dial, gearing operatively connecting said pointer to said conveyor whereby said pointer is moved over the face of the dial an angular distance greater than one revolution during the movement of each load carrier a distance equal to the space between adjacent carriers along said path and in which said load carriers are equally spaced along the conveyor.

4. In combination with an endless conveyor having ascending and descending reaches and a plurality of equally spaced load carriers which are normally in motion along a determined path, a plurality of loading mechanisms spaced along the ascending reach of said conveyor to deliver load units to said carriers, a plurality of unloading mechanisms spaced along the descending reach of said conveyor to remove load units from the carriers, electrical controls including, a stop switch associated with each of selected loading and unloading mechanisms for interrupting the motion of the carriers along said path in response to an abnormal condition locally, and mechanism for identifying any of said switches which is operated to interrupt the motion of said carriers comprising, a dial, a pointer movable over the face of said dial, means operatively connecting said pointer to said conveyor whereby said pointer is moved over the face of said dial at a rate which is proportional to the rate of movement of the conveyor load carriers along said path and indicia carried by the dial and adapted to identify the several positions of said stop switches along said path, said indicia being spaced apart along the path of said pointer proportionately to the spacing of the stop switches along the path of the conveyor load carriers.

5. The combination defined in claim 4 in which said means operatively connecting the pointer to the conveyor comprise gearing adapted to move the pointer over the face of the dial an angular distance greater than 360 degrees during the movement of each carrier a distance equal to the space between adjacent carriers along said path.

6. The combination defined in claim 4 in which said dial is provided with a plurality of concentric rows of indicia and the indicia of each row identify the several stop switches of a series which is distinct and separate from another series of stop switches.

7. The combination defined in claim 4 in which said means operatively connecting the pointer to the conveyor are adapted to move the pointer over the face of the dial an angular distance greater than 360 degrees during the movement of each carrier a distance equal to the space between adjoining carriers along said path and in which said dial is provided with a plurality of concentric rows of indicia and the indicia of each row identify the positions of several stop switches of a series which is distinct and separate from another series of stop switches.

8. In combination with an endless conveyor having ascending and descending reaches and a plurality of equally spaced load carriers which are normally in motion along a determined path, a plurality of stations spaced along the ascending and descending reaches of said conveyor, electrical controls including, a stop switch associated with each of said stations for interrupting the motion of the carriers along said path in response to an abnormal condition locally and mechanism for identifying any of said switches which is operated to interrupt the motion of said carriers comprising, a dial, a pointer movable over the face of said dial, means operatively connecting said pointer to said conveyor adapted to move the pointer over the face of said dial an angular distance greater than 360 degrees during the movement of each of said carriers a distance equal to the space between adjoining carriers along said path and whereby said pointer is moved over the face of said dial at a rate which is proportional to the rate of movement of said load carriers along said path, and a plurality of concentric rows of indicia carried by the dial and adapted to identify the several positions of said stop switches along said path, said indicia being spaced apart along the path of said pointer proportionately to the spacing of the stop switches along the path of said load carriers.

IRA S. EGGLESTON
CHARLES R. BOLLER.

REFERENCES CITED

The following references are of record in the file of this patent:

UNITED STATES PATENTS

| Number | Name | Date |
|---|---|---|
| 407,590 | Hall | July 23, 1889 |
| 746,433 | Adams | Dec. 8, 1903 |
| 1,444,775 | Bennett | Feb. 13, 1923 |
| 1,735,443 | Randles et al. | Nov. 12, 1929 |